United States Patent
Bi

(10) Patent No.: US 10,853,912 B2
(45) Date of Patent: Dec. 1, 2020

(54) METHOD AND APPARATUS FOR COMPLETE SIZE ADAPTATION OF OBJECT TO BE DISPLAYED

(71) Applicant: Alibaba Group Holding Limited, Grand Cayman (KY)

(72) Inventor: Bo Bi, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 10 days.

(21) Appl. No.: 15/852,464

(22) Filed: Dec. 22, 2017

(65) Prior Publication Data

US 2018/0122045 A1 May 3, 2018

Related U.S. Application Data

(63) Continuation of application No. PCT/CN2016/085937, filed on Jun. 16, 2016.

(30) Foreign Application Priority Data

Jun. 23, 2015 (CN) .......................... 2015 1 0351562

(51) Int. Cl.
*G06T 3/40* (2006.01)
*G06F 3/0481* (2013.01)
(Continued)

(52) U.S. Cl.
CPC ............ *G06T 3/40* (2013.01); *G06F 3/04845* (2013.01); *G06F 16/00* (2019.01);
(Continued)

(58) Field of Classification Search
CPC ........ G06T 3/40; G06F 17/212; G06F 3/0481
See application file for complete search history.

(56) References Cited

U.S. PATENT DOCUMENTS

2001/0029439 A1* 10/2001 Crain .................. G06Q 10/109
702/187
2005/0094205 A1* 5/2005 Lo ......................... G06F 17/212
358/1.18
(Continued)

FOREIGN PATENT DOCUMENTS

CN 1243287 A 2/2000
CN 101882074 11/2010
(Continued)

OTHER PUBLICATIONS

Translation of International Search Report from corresponding PCT application No. PCT/CN2016/085937 dated Oct. 25, 2016, 2 pages.
(Continued)

*Primary Examiner* — Yi Yang
(74) *Attorney, Agent, or Firm* — Lee & Hayes, P.C.

(57) ABSTRACT

A method and an apparatus for a complete size adaptation of an object to be displayed are provided. The method includes obtaining elements and description information of the elements included in an object to be displayed, the description information of the elements including information of parent-child relationships among the elements and rules for adaptation into display areas of different sizes based on the parent-child relationships; determining sizes and positions of the elements that are included in the object to displayed and are adapted to a current display area based on the elements and the description information of the elements that are obtained and size information of the current display area; and displaying the elements included in the object to be displayed in the current display area using the sizes and the positions that are determined.

13 Claims, 5 Drawing Sheets

(51) Int. Cl.
  *G06T 3/00* (2006.01)
  *G06F 16/00* (2019.01)
  *G06F 16/957* (2019.01)
  *G06F 3/0484* (2013.01)
  *G06T 5/00* (2006.01)

(52) U.S. Cl.
  CPC ........ G06F 16/9577 (2019.01); G06T 3/0012 (2013.01); G06T 5/003 (2013.01)

(56) References Cited

U.S. PATENT DOCUMENTS

| | | | | |
|---|---|---|---|---|
| 2010/0050130 | A1* | 2/2010 | Farn | G06F 8/38 715/853 |
| 2012/0102392 | A1* | 4/2012 | Reesman | G06F 16/9577 715/243 |
| 2013/0070275 | A1* | 3/2013 | Kawashima | H04N 1/32106 358/1.13 |
| 2013/0086525 | A1* | 4/2013 | Inkala | G06F 3/0484 715/825 |
| 2013/0162674 | A1* | 6/2013 | Nakamura | G06K 9/00671 345/633 |
| 2014/0320658 | A1 | 10/2014 | Pliefke | |
| 2015/0074516 | A1 | 3/2015 | Ben-Aharon et al. | |

FOREIGN PATENT DOCUMENTS

| | | |
|---|---|---|
| CN | 102323939 A | 1/2012 |
| CN | 102841790 | 12/2012 |
| CN | 103593196 | 2/2014 |
| WO | WO2015048154 | 4/2015 |

OTHER PUBLICATIONS

Translation of Written Opinion from corresponding PCT application No. PCT/CN2016/085937 dated Sep. 21, 2016, 5 pages.
Translation of CN Office Action from Corresponding CN Application No. 201510351562.5 dated Nov. 5, 2018, counterpart foreign application for U.S. Appl. No. 15/852,464, 7 pages.
Translation of CN Search Report from Corresponding CN Application No. 201510351562.5 dated Nov. 5, 2018, a counterpart foreign application for U.S. Appl. No. 15/852,464, 2 pages.

* cited by examiner

METHOD AND APPARATUS FOR COMPLETE SIZE ADAPTATION OF OBJECT TO BE DISPLAYED

CROSS REFERENCE TO RELATED PATENT APPLICATIONS

This application claims priority to and is a continuation of PCT Patent Application No. PCT/CN2016/085937 filed on 16 Jun. 2016, and is related to and claims priority to Chinese Patent Application No. 201510351562.5, filed on Jun. 23, 2015, entitled "Method and Apparatus for Complete Size Adaptation of Object to be Displayed," which are hereby incorporated by reference in their entirety.

TECHNICAL FIELD

The present disclosure relates to the field of computer technologies, and particularly to methods and apparatuses for a complete size adaptation of an object to be displayed.

BACKGROUND

An "object to be displayed" is a generic term for an object that can be displayed in any application interface of a web page or a terminal, which can be an image, or a combination of other information such as an image and a text, etc.

Conventionally, each production of an object to be displayed can only suit one size. In other words, when producing an object to be displayed, size and location information of all elements included in the object to be displayed is directly determined. These pieces of size and location information are fixed and unchanged. When the object to be displayed needs to be displayed in a certain display area, the size of the display area usually does not match with the produced size of the object to be displayed, thus leading to an occurrence of a situation in which the size of an object to be displayed does not fit with the size of a display area.

In order to solve the above problem, processing such as shrinking or enlarging an object to be displayed is generally used to implement a complete size adaptation of the object to be displayed. However, shrinking and enlarging processing affects a display effect of the object to be displayed. For example, a situation in which an object to be displayed is deformed or blurred may occur. Therefore, this type of processing cannot guarantee a display effect of an object to be displayed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

A technical problem to be solved by the present application is to provide a method and an apparatus for adapting a complete size of an object to be displayed, to guarantee a display effect of the object to be displayed and implement a complete size adaptation in a simple and convenient way at the same time.

According to an aspect of the embodiments of the present application, a method for a complete size adaptation of an object to be displayed is provided, which includes obtaining elements included in an object to be displayed and description information of the elements, the description information of the elements including parent-child relationships among the elements and rules for display areas of different sizes that are based on the parent-child relationships; determining sizes and positions of the elements included in the object to be displayed that are suitable for a current display area based on the elements and the description information of the elements that are obtained and size information of the current display area; and displaying the elements included in the object to be displayed in the current display area according to the determined sizes and positions.

According to another aspect of the embodiments of the present application, an apparatus for a complete size adaptation of an object to be displayed is provided, which includes an acquisition unit for obtaining elements included in an object to be displayed and description information of the elements, the description information of the elements including parent-child relationships among the elements and rules for display areas of different sizes that are based on the parent-child relationships; a determination unit used for determining sizes and positions of the elements included in the object to be displayed that are suitable for a current display area based on the elements and the description information of the elements that are obtained and size information of the current display area; and a display unit used for displaying the elements included in the object to be displayed in the current display area according to the determined sizes and positions.

The embodiments obtain elements included in an object to be displayed and description information of the elements, and can determine sizes and positions of the elements included in the object to be displayed that are suitable for a current display area based on the elements and the description information of the elements that are obtained and size information of the current display area, thus finally displaying the elements included in the object to be displayed in the current display area according to the determined sizes and positions. Since the description information of the elements includes parent-child relationships among the elements and rules for display areas of different sizes that are based on the parent-child relationships, a display effect of the object to be displayed can therefore be guaranteed based on these rules. At the same time, the object to be displayed can be adapt and match with different types of display areas in a simple and convenient way, without having situations in which the object to be displayed is deformed and blurred, etc.

Although the detailed description of the embodiments with reference to accompanying drawings will be given hereinafter, one of ordinary skill in the art can understand that the present application is not limited to these embodiments. Rather, the scope of the present application is broad, and the scope of the present application is intended to be defined by the appended claims.

BRIEF DESCRIPTION OF THE DRAWINGS

By reading and referencing the detailed description of the non-limiting embodiments using the following drawings, other features, goals and advantages of the present application can become more apparent.

Figure 1:
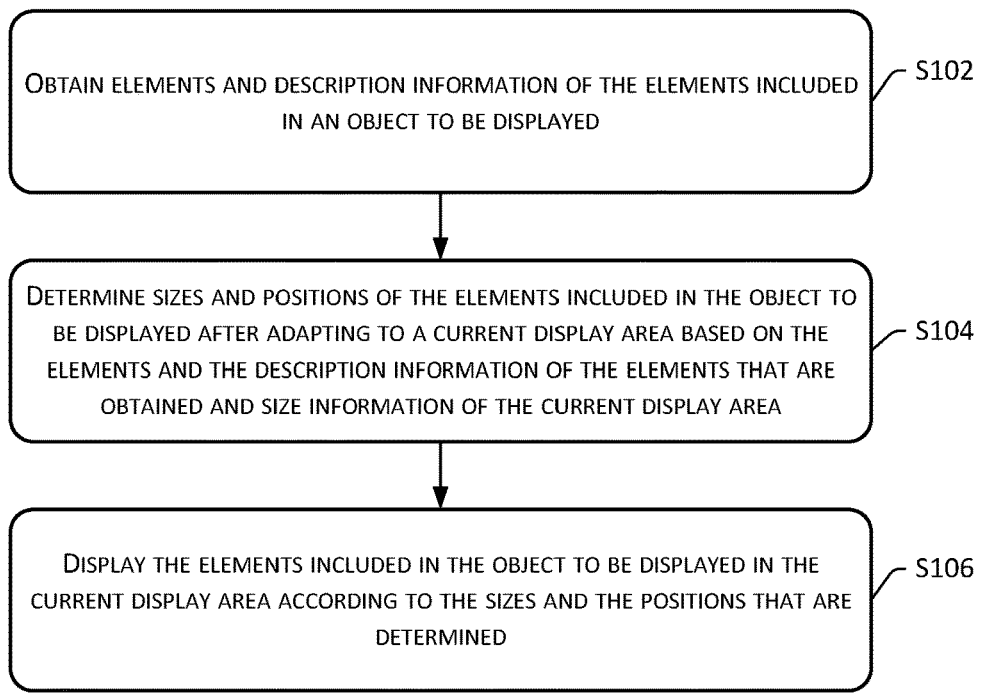
FIG. 1 is a flowchart of a method for a complete size adaptation of an object to be displayed in accordance with an embodiment of the present application.

The same or similar labels of the accompanying drawings represent the same or similar components in the accompanying drawings.

DETAILED DESCRIPTION

Prior to describing exemplary embodiments in more detail, it should be mentioned that some exemplary embodiments are described as processes or methods shown in flowcharts. Although operations in a flowchart are described in an order, a number of operations can be executed in parallel, concomitantly or concurrently. Furthermore, an order of operations can be reordered. When an operation is completed, a process thereof can be terminated. Moreover, additional procedures not included in the accompanying drawings may further exist. The process can correspond to a method, a function, a procedure, a subroutine, a subprogram, etc.

Computing devices includes a user device and a network device. The user device includes, but is not limited to, a computer, a smartphone, a PDA, etc. The network device includes, but is not limited to, a single network server, a server group formed by multiple servers, or a cloud that is formed by a large number of computers or network servers based on cloud computing. The cloud computing is a type of distributed computing, and is a super virtual computer that is formed by a set of loosely coupled computers. A computing device can be run alone to implement the present application, or can connect to a network and implement the present application by interactively operating with other computing devices in the network. The network in which the computing device is located includes, but is not limited to, the Internet, a wide area network, a metropolitan area network, a local area network, a VPN network, etc.

It should be noted that the user device, the network device and the network are merely examples. Other computing devices or networks that exist today or in the future, if applicable to the present application, shall be included in the scope of protection of the present application, and are incorporated by reference herein.

The method described hereinafter (in which some are shown using flowcharts) can be implemented using hardware, software, firmware, middleware, a microcode, a hardware description language, or any combination thereof. When software, firmware, middleware or a microcode is used for implementation, a program code or code segment that is used for implementing necessary tasks can be stored in machine or computer readable media (e.g., storage media). (One or more) processors can implement the necessary tasks.

Details of specific structures and functions disclosed herein are merely representative, and are used for the purpose of describing exemplary embodiments of the present application. The present application, however, can be implemented in many forms of replacement, and should not be interpreted as being limited by the embodiments described herein.

It should be noted that, although terms "first", "second", etc., may be used for describing various units herein, these units are not limited to these terms. These terms are used merely for distinguishing one unit from another unit. For example, without departing from the scope of the exemplary embodiments, a first unit can be called as a second unit, and a second unit can be called as a first unit in a similar manner. A term "and/or" used herein includes any or all combination of one or more listed items related therewith.

It should be noted that, when a unit is called to be "connected" or "coupled" to another unit, the unit can be directly connected or coupled to the other unit, or a unit may exist in between. Furthermore, no intermediate unit exist when a unit is called to be "directly connected" or "directly coupled" to another unit. Other phrases (such as "in between" compared to "directly in between", "adjacent to" compared to "directly adjacent to", etc.) that are used for describing relationships between units need to be interpreted in a similar manner.

Terminologies used herein are merely used for describing specific embodiments, and are not intended to limit the exemplary embodiments. Unless clearly specified for other meanings in the context, single forms "a" and "an", used herein are also intended to include a plural form. It should be noted that terms "comprising" and/or "including" used herein define an existence of features, numbers, steps, operations, units and/or components, and do not exclude an existence or addition of one or more other features, numbers, steps, operations, units, components and/or combinations.

It should also be noted that functions/actions described in some substitute implementations can take place in an order different from those shown in the accompanying drawings. For example, depending on functions/actions that are involved, two consecutive operations can be executed in parallel or can be executed in an opposite order in reality.

Complete size adaptation of an object to be displayed in the embodiments of the present application refers to fitting a size of the object to be displayed to display areas of different sizes and ensuring a display effect of the object to be displayed at the same time. Ensuring the display effect of the object to be displayed includes, but is not limited to keeping visual features of any one element in the object to be displayed unchanged.

A solution for a complete size adaptation implemented by the embodiments of the present application while ensuring a display effect of an object to be displayed is to package complete size adaptation and matching logics into a tool, and install the tool into a device that needs to implement complete size adaptation and matching (for example, a network device or a user device). An object to be displayed in the embodiments of the present application needs to be produced according to rules set by the present application. When performing a complete size adaptation and matching of an object to be displayed, a device having the tool installed therein determines a size of the object to be displayed based on the rules and a size of a display area, thus achieving an adaptation of the size of the object to be displayed to the size of the display area. An object to be displayed that is produced in this way can adapt to display areas of different sizes.

JavaScript language may be used for producing an object to be displayed that satisfies rules set in the embodiments of the present application. Apparently, the present application is not limited thereto. An object to be displayed that satisfies the rules set in the embodiments of the present application includes at least elements and description information of the elements.

The elements are components that form and are included in the object to be displayed.

For the sake of recognition, elements and description information of the elements can be labeled using designated property identifiers. For example, data-rwd identifiers may be used for labeling elements and description information of the elements.

The description information of the elements includes at least information of parent-child relationships among the elements, and rules for adapting to display areas of different sizes based on the parent-child relationships. In other words, the embodiments of the present application use parent-child relationships for describing relationships among elements. Since the embodiments of the present application adapt rules for display areas of different sizes based on parent-child relationships, when the rules describe sizes and positions of elements, not only respective allowable ranges of the sizes of the elements and distances among the elements can be described, but others (such as a certain size of a child element being the same as a certain size of another element, or a certain size of a child element having a ratio of a parent element, or a distance between a child element and a parent element on one side being multiple times of a certain size of another element, etc.) can also be described. In other words, rules for adapting to display areas of different sizes based on parent-child relationships can fully describe size and position relationships of elements, making a layout of the elements to be more flexible.

The rules for adapting to the display areas of different sizes based on the parent-child relationships include at least rules for determining sizes and positions of the elements when being displayed in the display areas of different sizes, and a priority order for determining the sizes and the positions of the elements after the adaptation.

The priority order for determining the sizes and the positions of the elements after the adaptation can be expressed using the following approach: indication information of the order of priority, or a sequential order declared by the elements.

The indication information of the priority order refers to the rules clearly indicating the priority order of the sizes and the positions of the elements determined after adaptation. The sequential order of the elements refers to a sequential order of appearance of the elements in the description information. Determining the priority order of the sizes and the positions of the elements after adaptation includes, but is not limited to, starting from an element(s) at the outermost parent layer, adapting sizes and positions of various elements from parent elements to child elements, determining adapted sizes and positions child elements under a same parent element according to an order of declaration, and determining adapted sizes and positions of child elements at a same level and under different parent elements without restrictions to a particular sequential order.

The rules may set that relative display positions of the elements can be different when the elements are displayed in display areas of different sizes. As can be seen, display styles of the elements can be flexibly configured using these rules.

The technical solutions of the present application are described in detail hereinafter in conjunction with the accompanying drawings.

FIG. 1 is a flowchart of a method 100 for a complete size adaptation of an object to be displayed in accordance with an embodiment of the present application. The method 100 is used for determining a size of an object to be displayed when the object to be displayed is displayed in a display area, to achieve a complete adaptation of the size of the object to be displayed to a size of the display area, and to ensure a display effect of the object to be displayed. As shown in FIG. 1, the method 100 includes the following operations.

S102 obtains elements and description information of the elements included in an object to be displayed.

S104 determines sizes and positions of the elements included in the object to be displayed after adapting to a current display area based on the elements and the description information of the elements that are obtained and size information of the current display area.

S106 displays the elements included in the object to be displayed in the current display area according to the sizes and the positions that are determined.

In order to further understand the method of the embodiment, the above operations are described in further detail hereinafter.

When the elements and the description information of the elements are obtained at S102, the elements and the description information of the elements can be identified based on designated property identifiers (e.g., data-rwd identifiers), to obtain all the elements that are identified.

In implementations, a HTML (hypertext markup language) grammar is used for labeling the elements and the description information of the elements of the object to be displayed. This not only satisfies customs of development of existing technologies, but is also able to display parent-child relationships among the elements in a convenient manner. For example, including and being-included relationships of elements in HTML represent parent-child relationships among elements. Furthermore, an order of determining sizes of the elements can be obtained using an order of declaration of the elements. Apparently, the embodiments of the present application are not limited thereto.

Figure 2:
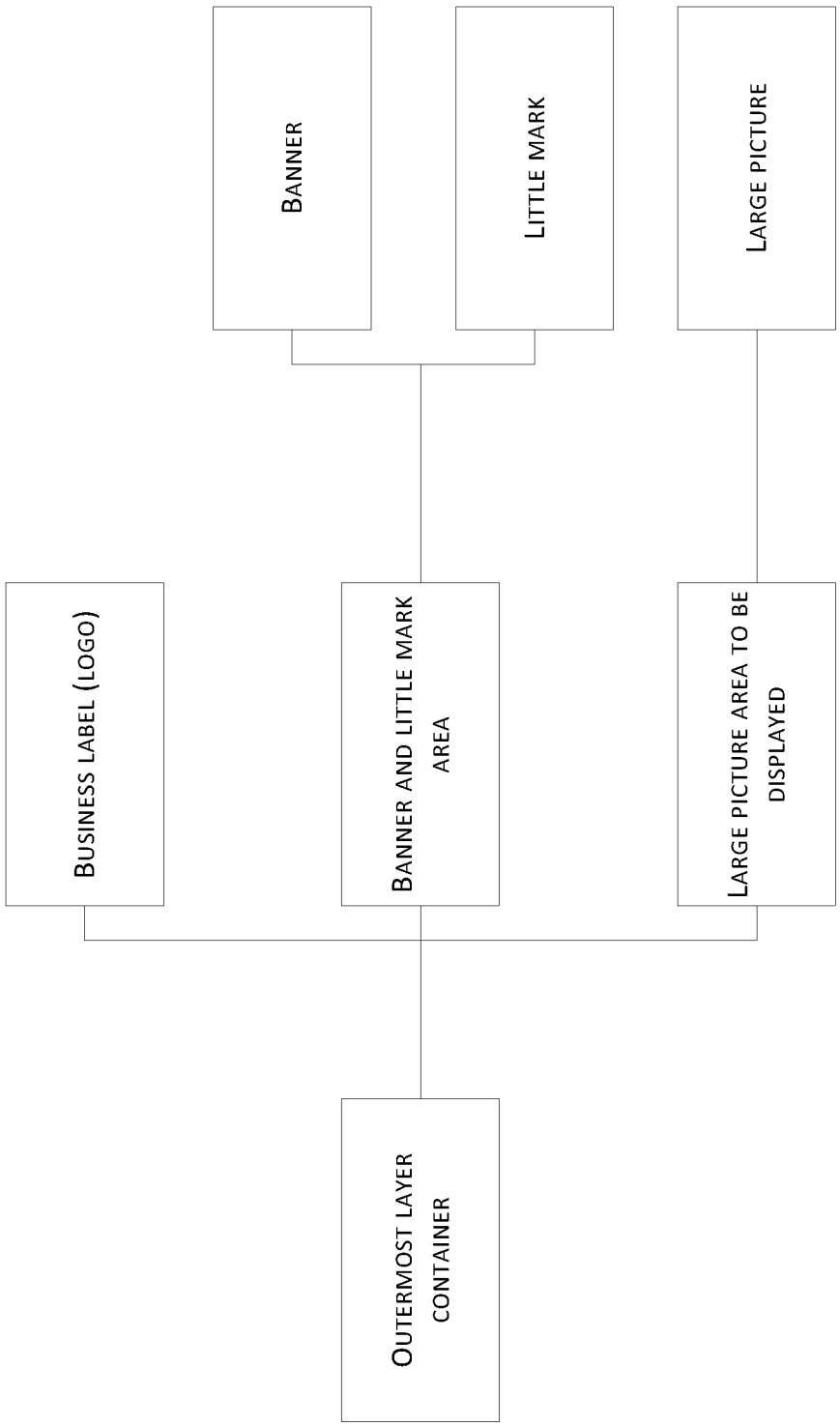
FIG. 2 is a schematic diagram of obtained parent-child relationships among elements in accordance with an embodiment of the present application.

In implementations, if the obtained elements that are included in the object to be displayed include an outermost layer container, a large picture area to be displayed, a large picture, a business identifier (logo), banner and little mark areas, a banner, and a little mark, FIG. 2 shows parent-child relationships of these elements that are obtained through the obtained description information of the elements. In FIG. 2, the large picture area to be displayed, the business label (logo), and the banner and little mark areas belong to a same level, and are child elements under a same parent element "outermost layer container". The banner and the little mark belong to a same level, and are both child elements under a parent element "banner and little mark areas". The large picture is a child element under the large picture area to be displayed.

The description information of the elements obtained in the present embodiment includes rules for adapting the elements to display areas of different sizes, and determining an order of priority of sizes and positions of the elements after adaptation. For example, the rules for adapting the elements to display areas of different sizes are as follows.

Rules for adapting a size of the outermost layer container are defined as superview.width, superview.height, i.e., a width and a height being consistent with a width and a height of a display area; a position of the outermost layer container as left: 0, top: 0, i.e., a left edge of the outermost layer container coinciding with a left edge of the display area and a top edge of the outermost layer container coinciding with a top edge of the display area. As such, the outermost layer container can be consistent with the display area regardless of the size of the display area.

A size of the business label (logo) is 100×80 px, and is automatically adapted according to a rule of "a minimal value for covering a child element". The rule of "a minimal value for covering a child element" refers to maintain the original size (i.e., 100×80 px) unchanged. A position of the business label (logo) is left: 0, bottom: 0, when the height of the display area is greater than 100 px. In other words, a left edge of the business label (logo) coincides with the left edge of the display area, and a bottom edge of the business label (logo) coincides with a bottom edge of the display area. When the height of the display area is less than or equal to 100 px, the position of the business label (logo) is top: 0, right: 0. In other words, a right edge of the business label (logo) coincides with a right edge of the display area, and a top edge of the business label (logo) coincides with the top edge of the display area.

Rules for determining a size of the banner and little mark areas are described using subtraction. The rules for determining the size of the area include: when the height of the display area is less than or equal to 100 px, a height of the banner and little mark area being the height of the display area minus a height of the business label (logo), a width of the banner and little mark area being equal to a width of the business label (logo), and a position of the banner and little mark area being bottom: 0, right: 0 (i.e., a bottom edge of the banner and little mark area coinciding with the bottom edge of the display area, and a left edge of the banner and little mark area coinciding with the left edge of the display area); when the height of the display area is greater than 100 px, the height of the banner and little mark area being equal to the height of the display area, the width of the banner and little mark area being the width of the display area minus the width of the business label (logo), and the position being bottom: 0, right: 0 (i.e., the bottom edge of the banner and little mark area coinciding with the bottom edge of the display area, and a right edge of the banner and little mark area coinciding with the right edge of the display area). A child element (the banner) of this element is displayed in the parent element with a distance of separation from the little mark of the same level by 1% in the vertical direction. The little mark is hidden when the height of the display area is less than or equal to 100 px.

Rules for determining a size of the banner includes: when the height of the display area is greater than 100 px, a width of banner being the width of the display area subtracted by the width of the business label (logo) and further subtracted by 40 px, a height of the banner being 30 px, and a position of the banner being left: 0 (i.e., separated from a left edge of a parent element thereof by 20 px). Furthermore, a size of a font in the banner can be designated. When the height of the display area is less than or equal to 100 px, the height of the banner is equal to the height of the banner and little mark area, and the width of the banner is equal to the width of the banner and little mark area.

Rules for determining a size of the little mark include: when the height of the display area is greater than 100 px, a width of the little mark being consistent with that of the banner, a height being 20 px, and a position being left: 0 (i.e., a left edge being separated from a parent element thereof by 20 px). When the height of the display area is less than or equal to 100 px, the little mark is hidden.

A rule for determining a width of the large picture area to be displayed is defined as: when the height of the display area is greater than 100 px, superview.width, i.e., a width being consistent with the width of the display area. A rule for a height is defined as the height of the display area subtracted by the height of the business label (logo). A position is left: 0, top: 0, i.e., separated from the left edge and the top edge of a parent element "outermost layer container" by 0. When the height of the display area is less than or equal to 100 px, the width of the large picture area to be displayed is the width of the display area subtracted by the width of the business label (logo), the height of the large picture area to be displayed is the height of the display area, and the position of large picture area to be displayed is left: 0, top: 0.

Rules for determining a size of the large picture is represented using a function, keep. In other words, the large picture is zoomed according to a ratio between a width and a height of the large picture that is currently set. If the set ratio between the width and the height for the large picture is 5:3, and a position is represented using a contain function, the position of the large picture is fully displayed in the parent element "large picture area to be displayed", i.e., fully covering the area of the parent element.

The above description is merely an example. In a real application, rules for determining sizes and positions can be set correspondingly for display areas of a variety of different sizes (size ranges).

If the rules do not include indication information about an order of priority that indicates the order of priority of elements during adaptation, this indicates that the order of priority is determined according to an order of declaration of the elements. In other words, an adapted size and an adapted position are determined first for whichever declares first among child elements at a same level and under a same parent element. For child elements at a same level and under different parent elements, no restriction is set for an order of determining adapted sizes and adapted positions thereof. In the foregoing embodiments, an order of declaration of the elements is: outermost layer container-business label (logo)-banner and little mark area-banner-little mark-large picture area to be displayed-large picture.

At S104, the size information of the current display area needs to be obtained first (the embodiments of the present application do not have any limitations on specific acquisition methods). Sizes and positions of the elements included in the object to be displayed after being adapted to the current display area are then determined according to an obtained order of priority for determining adapted sizes and positions of the elements, based on the elements and the description information of the elements that are obtained and the size information of the current display area.

The above example is also used here. In the above example, the outermost layer container is the outermost layer element. Therefore, when adapted sizes and positions of the elements are determined, an adapted size and an adapted position of the outermost layer container are determined first. Since no element is at the same level of the outermost layer container, determining according to an order from a parent element to child element(s) is determining adapted sizes and adapted positions of child elements that are included in the outermost layer container, which include determining respective adapted sizes and respective adapted positions of three child elements—the business label (logo), the banner and little mark area, and the large picture area to be displayed, and determining the sizes and the positions of these three child elements according to an order of declaration of the three child elements. In other words, the sizes and the positions of the three child elements are determined according to an order of business label (logo)—banner and little mark area—large picture area to be displayed. Adapted sizes and positions of child elements respectively included these three child elements are then determined, which includes determining adapted sizes and adapted positions of the banner and the little mark, and determining adapted sizes and adapted positions of the large picture area to be displayed. The adapted sizes and the adapted positions of the banner and the little mark, being under a same parent element, are determined according to an order of declaration. In other words, an adapted size and an adapted position of the banner are determined first, and then an adapted size and an adapted position of the little mark are determined. No restriction on an order of determination is made for the large picture, as the large picture is not under the same parent element of the banner and the little mark. In other words, an adapted size and an adapted position of the large picture can be determined at the time when, before or after those of the banner and/or the little mark are determined.

In the embodiments, adapted sizes and positions of various elements are determined according to a specific order (i.e., an obtained order of priority of determining the adapted sizes and positions of the elements). As such, problems of calculation conflicts will not occur. In other words, an adapted size and an adapted position of a same element that are obtained are unique.

According to the rules that are obtained in the foregoing embodiments, if the size of the current display area in an example is 590×400 px, the sizes and the positions of the elements obtained after adaptation are as follows.

The width and the height of the outermost layer container are consistent with the width and the height of the current display area. In other words, the size of the outermost layer container is 590×400 px. The position is: the left edge of the outermost layer container coinciding with the left edge of the current display area, and the top edge of the outermost layer container coinciding with the top edge of the current display area.

The business label (logo) is displayed in an actual size (100×80 px) thereof. The position is: the left edge of the business label (logo) coinciding with the left edge of the current display area, and the bottom edge thereof coinciding with the bottom edge of the current display area.

The width of the banner and little mark area is a value obtained after subtracting the width of the current display area by the width of the business label (logo), i.e., 590−100=490 px. The height thereof is 80 px, be the same as the value of the business label (logo). The position is: the right edge of the area coinciding with the right edge of the current display area, and the bottom edge thereof coinciding with the bottom edge of the current display area.

The width of the banner is obtained after subtracting the width of the current display area by the width of the business label (logo) and 40 px, i.e., 590−100−40=450 px. The height is 30 px. The position is: the left edge being separated from the parent element (the banner and the little area) by 20 px.

The width of the little mark is consistent with the width of the banner, I.e., 450 px, and the height is 20 px. The position is: the left edge being separated from the parent element by 20 px. The banner and the little mark are displayed in a vertical direction, and separated from the parent element thereof by 1%, with the banner, separated by 1%, and the little mark, separated by 1%.

The width of the large picture area to be displayed is consistent with the width of the current display area (590 px). The height is the height of the current display area minus the height of the business label (logo), i.e., 400−80=320 px. The position is: the left edge coinciding with the left edge of the current display area, and the top edge coinciding with the top edge of the current display area.

The size of the large picture is zoomed according to the ratio (5:3) between the width and the height that is set for the large picture, causing the large picture to full cover the entire area of the large picture area to be displayed.

In another example, if the size of the current display area that is obtained is a size of a display area having 310×100 px, the height of the current display area is greater than 100 px, the adapted sizes and the adapted positions of the elements are determined as follows.

The width and the height of the outermost layer container are consistent with the width and the height of the current display area. In other words, the size of the outermost layer container is 310×100 px. The position is: the left edge of the outermost layer container coinciding with the left edge of the current display area, and the top edge of the outermost layer container coinciding with the top edge of the current display area.

The business label (logo) is displayed in an actual size (100×80 px) thereof. The position is: the top edge of the business label (logo) coinciding with the top edge of the current display area, and the right edge thereof coinciding with the right edge of the current display area.

The width of the banner and little mark area is the same as the width of the business label (logo), i.e., 80 px. The height is the height of the current display area minus the height of the business label (logo), i.e., 100−80=20 px. The position is: the right edge of the area coinciding with the right edge of the current display area, and the bottom edge coinciding with the bottom edge of the current display area.

The size and the position of the banner are the same as those of the parent element—the banner and little mark area. The little mark is hidden.

The height of the large picture area to be displayed is consistent with the height of the current display area, i.e., 100 px. The width is the width of the current display area minus the width of the business label (logo), i.e., 310−100=210 px. The position is: the left edge coinciding with the left edge of the current display area, and the top edge coinciding with the top edge of the current display area.

The size of the large picture is zoomed according to the ratio (5:3) between the width and the height that is set for the large picture, causing the large picture to full cover the entire area of the large picture area to be displayed.

S104 completes the determination of the size and the position of the object to be that are adapted to the current display area. S106 displays the elements of the object to be displayed in the current display area using the determined size and the determined position.

Figure 3:
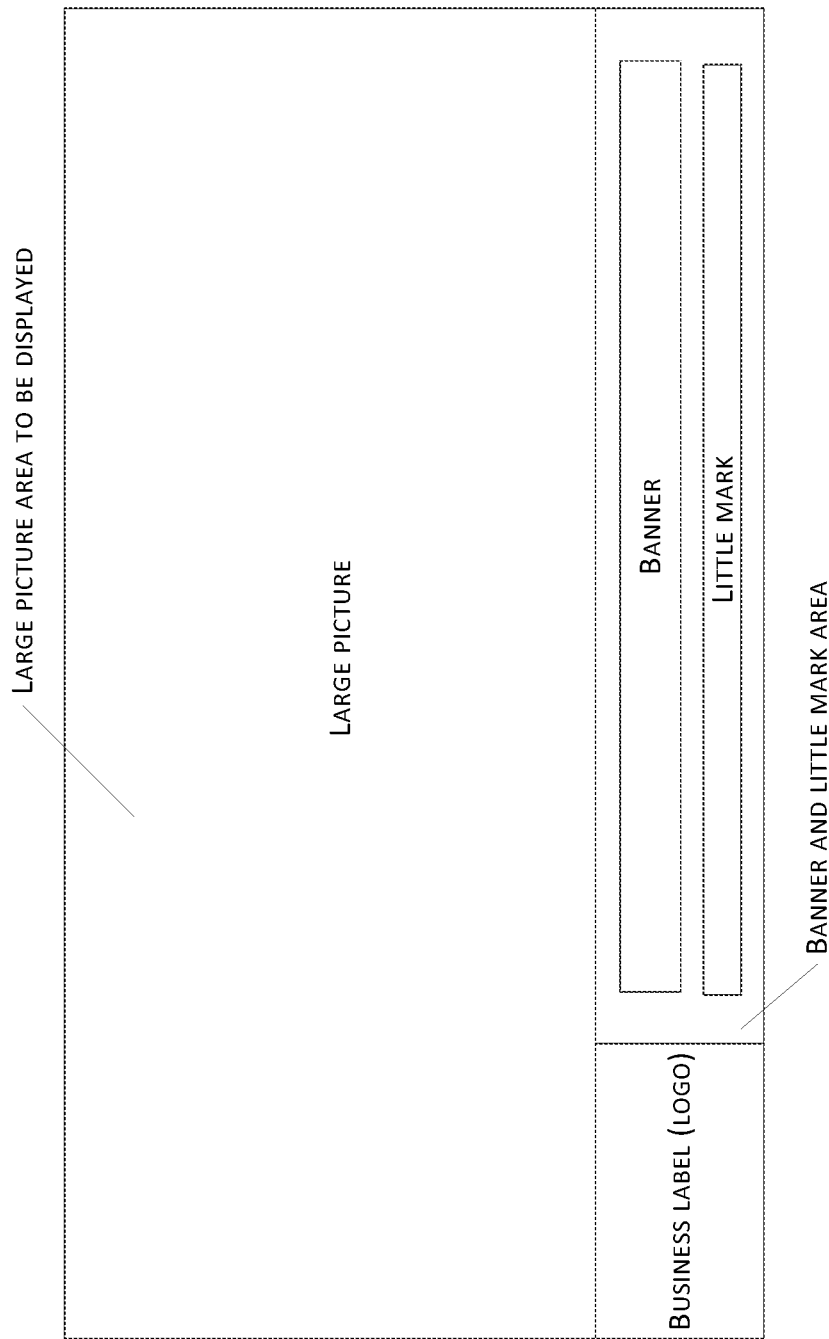
FIG. 3 is a schematic diagram of displaying an object to be displayed after adaptation in accordance with an embodiment of the present application.

Under a condition that the size of the current display area is 590×400 px, an example for displaying the object to be displayed in the current displayed area using the adapted sizes and the adapted positions of the elements that are determined is shown in FIG. 3.

Figure 4:
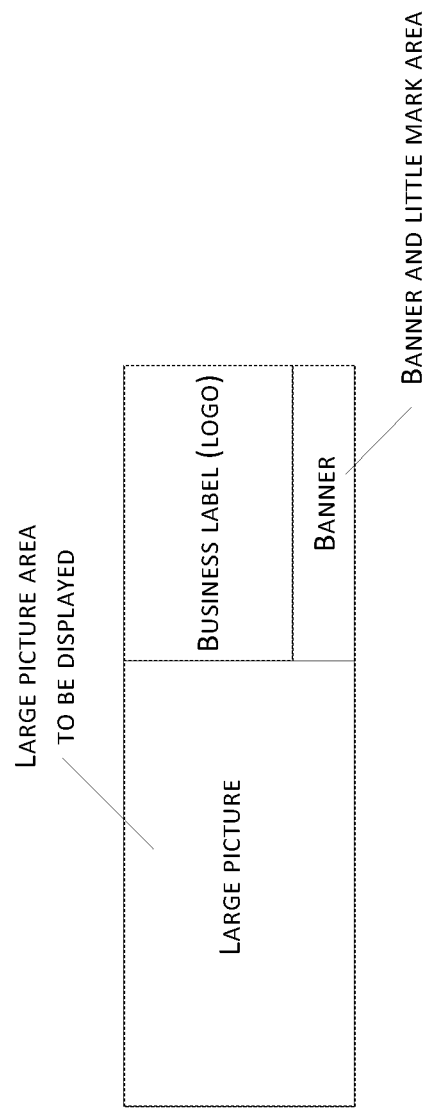
FIG. 4 is a schematic diagram of displaying an object to be displayed after adaptation in accordance with another embodiment of the present application.

Under a condition that the size of the current display area is a size (310×100 px) of a display area, an example for displaying the object to be displayed in the current displayed area using the adapted sizes and the adapted positions of the elements that are determined is shown in FIG. 4.

As can be seen, adaptation and fitting into display areas of different sizes cab be made according to rules designed for an object to be displayed, thus implementing a complete size adaptation of the object to be displayed. As can be seen from the above description, when an object to be displayed is produced, the embodiments do not need to be concerned with specific fitting methods, but only need to pay attention to display styles of various elements. Specific fitting methods can be completed by a device having fitting and adaptation capabilities when the object to be displayed is displayed.

By setting up rules for adapting various elements when an object to be displayed is produced, the embodiments of the present application enable the object to be displayed to achieve a complete size adaptation with the rules being relatively flexible. This can guarantee an overall display effect of the object to be displayed during the complete size adaptation. Furthermore, sizes of current elements can be set to remain unchanged when adapting to display areas of different sizes, to ensure a better display effect of the elements.

Figure 5:
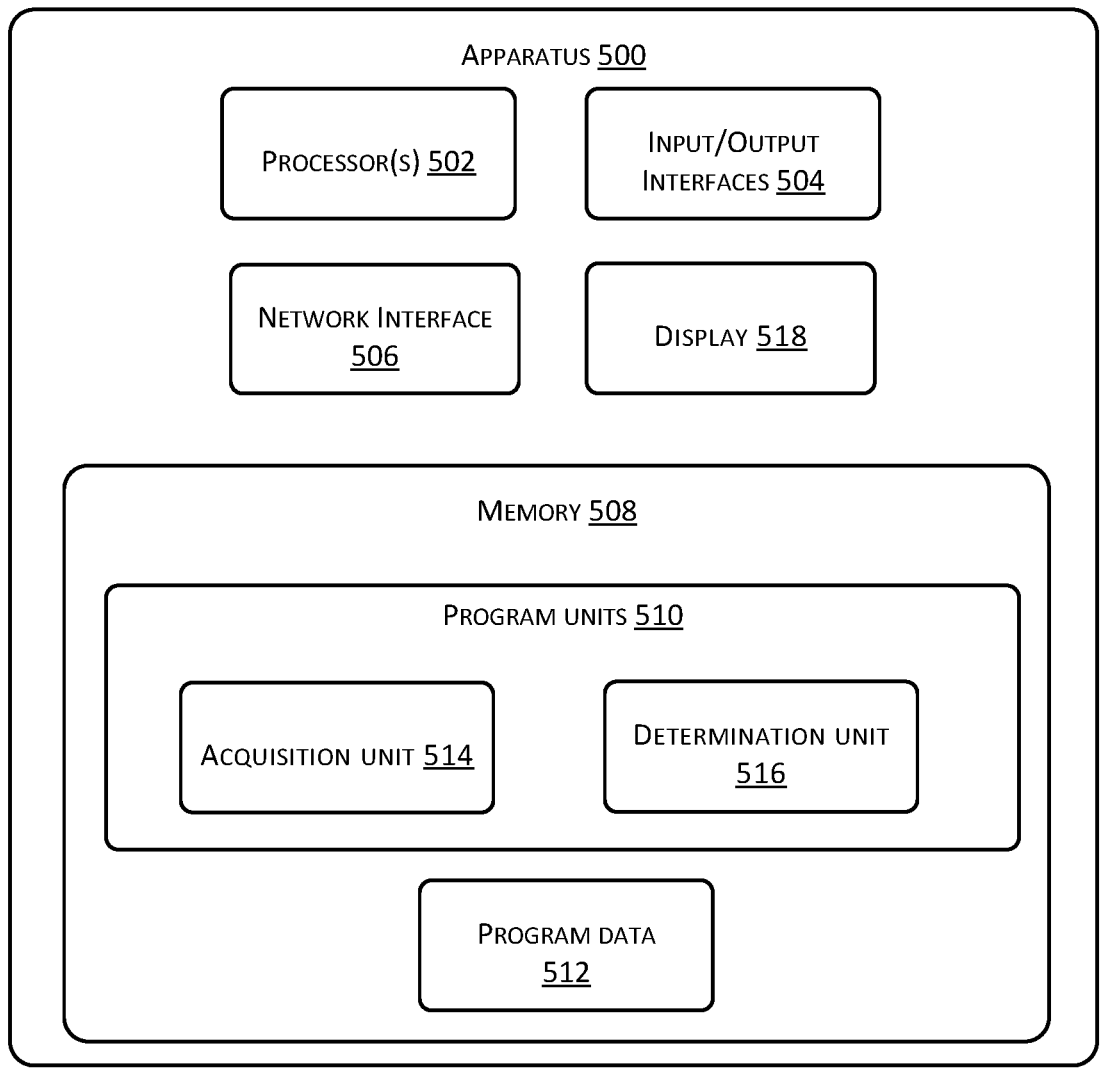
FIG. 5 is a schematic diagram of an apparatus for a complete size adaptation of an object to be displayed in accordance with an embodiment of the present application.

Corresponding to the method for a complete size adaptation of an object to be displayed, the embodiments of the present application further provides an apparatus 500 for a complete size adaptation of an object to be displayed. The apparatus 500 is set up in a network device or a user device. FIG. 5 shows a structural diagram of the apparatus 500. In embodiments, the apparatus 500 may include one or more processors 502, an input/output (I/O) interface 504, a network interface 506, and memory 508.

The memory 508 may include a form of computer readable media such as a volatile memory, a random access memory (RAM) and/or a non-volatile memory, for example, a read-only memory (ROM) or a flash RAM. The memory 508 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 508 may include program units 510 and program data 512. The program units 510 may include an acquisition unit 514 configured to obtain elements and description information of the elements included in an object to be displayed, the description information of the elements including information of parent-child relationships among the elements, and rules for adapting to display areas of different sizes based on the parent-child relationships. In other words, the embodiments of the present application use parent-child relationships to describe relationships among elements. Since the embodiments of the present application adapt and fit rules for display areas of different sizes based on parent-child relationships, when sizes and positions of elements are described in the rules, not only allowable ranges of the elements and distances among the elements, for example, can be described, but also others (such as a certain size of a child element being the same as a certain size of another element, or a certain size of a child element having a ratio of a parent element, or a distance between a child element and a parent element on one side being multiple times of a certain size of another element, etc.) can also be described. In other words, rules for adapting to display areas of different sizes based on parent-child relationships can fully describe size and position relationships of elements, making a layout of the elements to be more flexible.

The program units may further include a determination unit 516 which is configured to determine sizes and positions of the elements included in the object to be displayed that are adapted to a current display area based on the elements and the description information of the elements that are obtained and size information of the current display area.

In embodiments, the apparatus 500 may further include a display unit or a display 518 which is configured to display the elements included in the object to be displayed in the current display area using the determined sizes and the determined positions.

The embodiments of the present application can use designated property identifiers to label the elements and the description information of the elements included in the object to be displayed. For example, data-rwd may be used for labeling the elements and the description information of the elements in the object to be displayed. In this case, the acquisition unit 50 is configured to obtain the elements and the description information of the elements included in the object to be displayed using the designated property identifiers.

In the embodiments, the rules for adapting to display areas of different sizes based on the parent-child relationships include rules for determining sizes and positions of the elements when being displayed in the display areas of different sizes, and a priority order for determining the sizes and the positions of the elements after the adaptation.

The priority order for determining the sizes and the positions of the elements after adaptation can be expressed using the following approach: indication information of the order of priority, or an order declaration of the elements.

The indication information of the priority order refers to the rules clearly indicating the priority order of the sizes and the positions of the elements determined after adaptation. The order of declaration of the elements refers to a sequential order of appearance of the elements in the description information. Determining the priority order of the sizes and the positions of the elements after adaptation includes, but is not limited to, starting from an element(s) at the outermost parent layer, adapting sizes and positions of various elements from parent elements to child elements, determining adapted sizes and positions child elements under a same parent element according to an order of declaration, and determining adapted sizes and positions of child elements at a same level and under different parent elements without restrictions to a particular sequential order.

The rules may set that relative display positions of the elements can be different when the elements are displayed in display areas of different sizes. As can be seen, display styles of the elements can be flexibly configured using these rules.

In short, the method and the apparatus for a complete size adaptation of an object to be displayed in the embodiments of the present application obtain elements and description information of the elements included in an object to be displayed that is produced according to designated rules. The description information of the elements includes information of parent-child relationships among the elements, and rules for adapting to display areas of different sizes based on the parent-child relationships. Sizes and positions of the elements that are included in the object to be displayed after adapting to a current display area can be determined based on the elements and the description information of the elements that are obtained and size information of the current display area. At the end, the elements included in the object to be displayed are displayed in the current display area according to the sizes and the positions that are determined. Therefore, an object to be displayed according to the embodiments of the present application can adapt to display areas of different sizes while ensuring display effects, without occurrences of situations such as deformation due to enlarging/shrinking of the object to be displayed.

Furthermore, when an object to be displayed is produced, the embodiments do not need to be concerned with specific fitting methods, but only need to pay attention to display styles of various elements. Complete size adaptation capabilities are packaged into a tool which is added/loaded into a device. This not only simplifies a production of an object to be displayed, but also makes a complete size adaptation and fitting of the object to be displayed to be more convenient and faster.

It should be noted that the present application can be implemented by software and/or a combination of software and hardware, for example, can be implemented using an application-specific integrated circuit (ASIC), a general-purpose computer, or any other similar hardware. In an embodiment, a software program of the present application can implement the foregoing operations or functions through execution of processor(s). Similarly, a software program (which includes related data structures) of the present application can be stored in a computer-readable recording media, such as a RAM storage device, a magnetic or optical drive, a floppy magnetic disk, or a similar device. Furthermore, some operations or functions of the present application can be implemented using hardware, e.g., circuit(s) that cooperate with processor(s) to execute various operations or functions.

Moreover, a portion of the present application can be applied as a computer program product, for example, computer program instructions that, when executed by processor(s), are able to invoke or provide the method and/or the technical solution of present application through operations of the processor(s). The program instructions that invoke the method of the present application may be stored in a fixed or movable recording media, and/or transmitted through broadcasting or data flow in other signal carrier media, and/or stored in a working storage device of a computing device that runs according to the program instructions. According to the embodiments of the present application, an apparatus is included. The apparatus includes a storage device used for storing computer program instructions, and processor(s) used for executing the program instructions. The computer program instructions, when executed by the processor(s), cause the apparatus to run methods and/or the technical solutions according to the foregoing embodiments of the present application.

For one skilled in the art, the present application apparently is not limited by the details of the foregoing exemplary embodiments. Without departing from the spirit and the basic features of the present application, the present application can be implemented in other forms. Therefore, regardless of which point of view, the embodiments should be considered as exemplary, and not limiting. The scope of the present application is defined by the appended claims, and not the above description. Therefore, the present application is intended to cover all modifications that are equivalent to the claims in meaning and scope. No drawing labels in the claims should be considered as limitations to the claims that are involved. Furthermore, a term "include" apparently does not exclude other units or acts. A single form does not exclude a plural form. Multiple units or apparatuses described in a system claim can also be implemented by a single unit or apparatus through software or hardware. Terms such as first, second, etc., are used for representing names, and do not represent any specific order.

What is claimed is:

1. A method implemented by one or more computing devices, the method comprising:
    obtaining elements and description information of the elements included in an object to be displayed using designated property identifiers configured to label the elements and the description information of the elements, the description information of the elements including:
        information of parent-child relationships among the elements, and
        rules defining positional relationships among the elements and adaptation orders of the elements, enabling the elements to be adaptably fitted together to be displayed in a display area based on the parent-child relationships, independently of the size of the display area;
    determining sizes and positions of the elements for adapting to a current display area based on the description information of the elements and the size information of the current display area, the determination further including:
        determining whether the rules include an indication of a priority order for determining the sizes and the positions of the elements;
        in response to a determination that the rules include the indication of the priority order, determining the sizes and positions of the elements according to the indication of the priority order; and
        in response to a determination that the rules do not include the indication of the priority order, determining the priority order according to an order of declaration of the elements and determining the sizes and positions of the elements according to the order of declaration; and
    displaying the elements in the current display area using the sizes and the positions that are determined.

2. The method of claim 1, wherein the priority order comprises:
    starting from a parent element at an outermost layer, adapting the sizes and the positions of the elements according to an order from the parent element to child elements; and
    adapting respective sizes and positions of child elements at a same level and under a same parent element according to a respective order of declaration of the child elements.

3. The method of claim 2, wherein respective sizes and positions of a plurality of elements at a same level and under different parent elements are adapted without being restricted to a specific order.

4. The method of claim 1, wherein the rules describe at least respective allowable ranges of the sizes of the elements, and distances among the element.

5. The method of claim 1, wherein the rules further define at least one element to be displayed maintaining an original size unchanged, independently of the size of the display area.

6. The method of claim 1, wherein the rules further define that when the display size and position of a subsequent child element on the current display area is coincident with the display size and position of its parent element, at least another subsequent child element at a lower order of declaration is determined not to display on the current display area.

7. An apparatus comprising:
one or more processors;
memory;
an acquisition unit stored in the memory and executable by the one or more processors to obtain elements and description information of the elements included in an object to be displayed using designated property identifiers configured to label the elements and the description information of the elements, the description information of the elements including:
   information of parent-child relationships among the elements, and
   rules defining positional relationships among the elements and adaptation orders of the elements, enabling the elements to be adaptably fitted together to be displayed in a display area based on the parent-child relationships, independently of the size of the display area; and
a determination unit stored in the memory and executable by the one or more processors to determine sizes and positions of the elements for adapting to a current display area based on the description information of the elements and the size information of the current display area, the determination further including:
   determining whether the rules include an indication of a priority order for determining the sizes and the positions of the elements;
   in response to a determination that the rules include the indication of the priority order, determining the sizes and positions of the elements according to the indication of the priority order; and
   in response to a determination that the rules do not include the indication of the priority order, determining the priority order according to an order of declaration of the elements and determining the sizes and positions of the elements according to the order of declaration; and
a display configured to display the elements in the current display area using the sizes and the positions that are determined.

8. The apparatus of claim 7, wherein the priority order comprises:
   starting from a parent element at an outermost layer, adapting the sizes and the positions of the elements according to an order from the parent element to child elements; and
   adapting respective sizes and positions of child elements at a same level and under a same parent element according to a respective order of declaration of the child elements.

9. The apparatus of claim 7, wherein the rules describe at least respective allowable ranges of the sizes of the elements, and distances among the element.

10. One or more computer-readable media storing executable instruction that, when executed by one or more processors, cause the one or more processors to perform acts comprising:
   obtaining elements and description information of the elements included in an object to be displayed using designated property identifiers configured to label the elements and the description information of the elements, the description information of the elements including:
      information of parent-child relationships among the elements, and
      rules defining positional relationships among the elements and adaptation orders of the elements, enabling the elements to be adaptably fitted together to be displayed in a display area, independently of the size of the display area based on the parent-child relationships;
   determining sizes and positions of the elements for adapting to a current display area based on the description information of the elements and the size information of the current display area, the determination further including
      determining whether the rules include an indication of a priority order for determining the sizes and the positions of the elements;
      in response to a determination that the rules include the indication of the priority order, determining the sizes and positions of the elements according to the indication of the priority order; and
      in response to a determination that the rules do not include the indication of the priority order, determining the priority order according to an order of declaration of the elements and determining the sizes and positions of the elements according to the order of declaration; and
   displaying the elements in the current display area using the sizes and the positions that are determined.

11. The one or more computer-readable media of claim 10, wherein the priority order comprises:
   starting from a parent element at an outermost layer, adapting the sizes and the positions of the elements according to an order from the parent element to child elements; and
   adapting respective sizes and positions of child elements at a same level and under a same parent element according to a respective order of declaration of the child elements.

12. The one or more computer-readable media of claim 11, wherein respective sizes and positions of a plurality of elements at a same level and under different parent elements are adapted without being restricted to a specific order.

13. The one or more computer-readable media of claim 10, wherein the rules describe at least respective allowable ranges of the sizes of the elements, and distances among the element.

* * * * *